(12) United States Patent
Swaminathan et al.

(10) Patent No.: US 8,953,583 B2
(45) Date of Patent: Feb. 10, 2015

(54) METHOD AND SYSTEM FOR SELECTIVE CALL FORWARDING BASED ON MEDIA ATTRIBUTES IN TELECOMMUNICATION NETWORK

(75) Inventors: Seetharaman Swaminathan, Chennai (IN); Ananthakrishnan Sujatha, Chennai (IN); Kuldeep Singh, Haryana (IN); Durgesh Mishra, Uttar Pradesh (IN)

(73) Assignee: Alcatel Lucent, Boulogne-Billancourt (FR)

( * ) Notice: Subject to any disclaimer, the term of this patent is extended or adjusted under 35 U.S.C. 154(b) by 87 days.

(21) Appl. No.: 13/056,214

(22) PCT Filed: Jul. 16, 2009

(86) PCT No.: PCT/EP2009/059137
§ 371 (c)(1),
(2), (4) Date: Aug. 17, 2011

(87) PCT Pub. No.: WO2010/012605
PCT Pub. Date: Feb. 4, 2010

(65) Prior Publication Data
US 2011/0292839 A1    Dec. 1, 2011

(30) Foreign Application Priority Data

Jul. 30, 2008  (EP) .................................... 08161476

(51) Int. Cl.
*H04L 12/66*  (2006.01)
*H04L 29/06*  (2006.01)

(52) U.S. Cl.
CPC ........ *H04L 65/1096* (2013.01); *H04L 65/1006* (2013.01); *H04L 65/1069* (2013.01); *H04L 65/80* (2013.01); *H04L 65/1016* (2013.01); *H04L 65/4015* (2013.01)
USPC ............ 370/352; 370/356; 370/259; 370/401

(58) Field of Classification Search
CPC ...... H04L 12/01; H04L 65/1006; H04L 67/28
USPC ......... 370/352–356, 259, 401, 468, 260, 351; 379/212.01, 221.01, 211.02, 201.01, 379/32.03; 455/414.1
See application file for complete search history.

(56) References Cited

U.S. PATENT DOCUMENTS 7,149,522 B2 * 12/2006 Koskelainen .............. 455/435.1
7,460,548 B2 * 12/2008 Stumer ......................... 370/401
(Continued)

FOREIGN PATENT DOCUMENTS

| WO | WO 03/012669 A | 2/2003 |
| WO | WO 2006/096023 A | 9/2006 |
| WO | WO 2008/079630 A | 7/2008 |

OTHER PUBLICATIONS

Sparks Dynamicsoft R., "The Session Initiation Protocol (SIP) Refer Method; rfc3515.txt," IETF Standard, Internet Engineering Task Force, IETF, CH, pp. 1-21, XP015009297, Apr. 1, 2003.
(Continued)

*Primary Examiner* — Dang Ton
*Assistant Examiner* — Sai Aung
(74) *Attorney, Agent, or Firm* — Fay Sharpe LLP

(57) ABSTRACT

A method of forwarding a call based on media attributes of the call in a telecommunications network is disclosed. The call forwarding services includes call forwarding based on SDP attributes, media-based partial call forwarding and partial call forwarding to multiple destinations. The method comprises comparing parameters of SDP with call forwarding parameter of the user, obtaining a match between one of the SDP parameters and the call forwarding parameters, sending a REFER message in case of partial call forwarding, multiple REFER messages in case of partial call forwarding to multiple destinations to network of calling user, and forwarding the call to other terminals as specified in the call forwarding parameters. The call forwarding based on media attributes enables a served user to forward communications based on media attributes conveyed over SDP for an IMS/SIP user.

9 Claims, 18 Drawing Sheets

(56) References Cited

U.S. PATENT DOCUMENTS

| | | | |
|---|---|---|---|
| 7,489,771 B2 * | 2/2009 | McMurry et al. | 379/201.01 |
| 7,620,167 B2 * | 11/2009 | Kucmerowski et al. | 379/212.01 |
| 7,668,305 B2 * | 2/2010 | Akizuki et al. | 379/211.01 |
| 7,876,888 B2 * | 1/2011 | Chatterjee et al. | 379/201.01 |
| 7,899,172 B2 * | 3/2011 | Poustchi et al. | 379/211.02 |
| 8,121,280 B1 * | 2/2012 | Stucker | 379/207.16 |
| 8,200,189 B2 * | 6/2012 | Desai et al. | 455/406 |
| 8,223,757 B2 * | 7/2012 | Jackson et al. | 370/356 |
| 8,301,130 B1 * | 10/2012 | Gunasekara et al. | 455/418 |
| 8,462,768 B2 * | 6/2013 | Badger | 370/352 |
| 2005/0060411 A1 * | 3/2005 | Coulombe et al. | 709/227 |
| 2011/0032930 A1 * | 2/2011 | Belling | 370/352 |

OTHER PUBLICATIONS

International Search Report for PCT/EP2009/059137 dated Aug. 27, 2009.

* cited by examiner

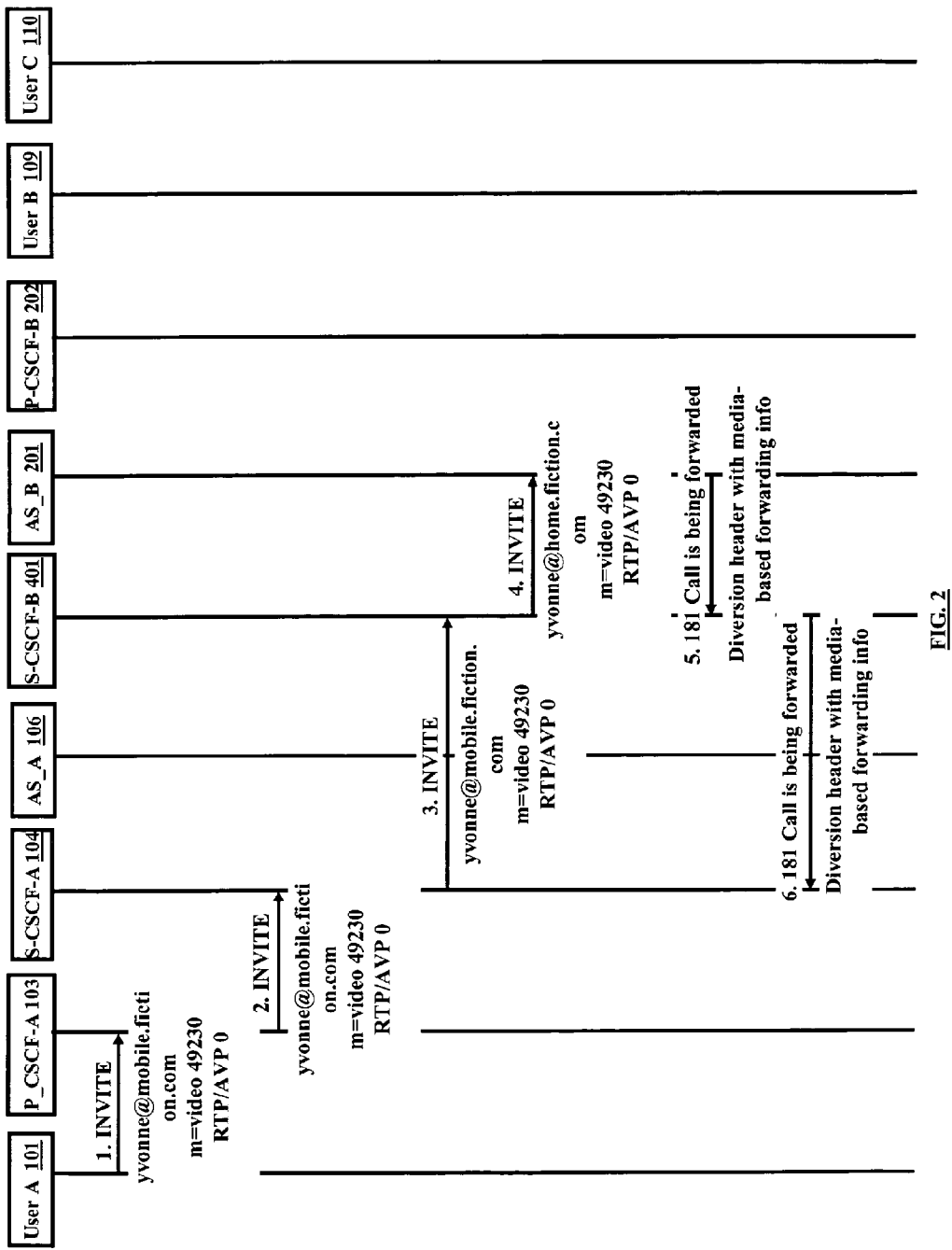

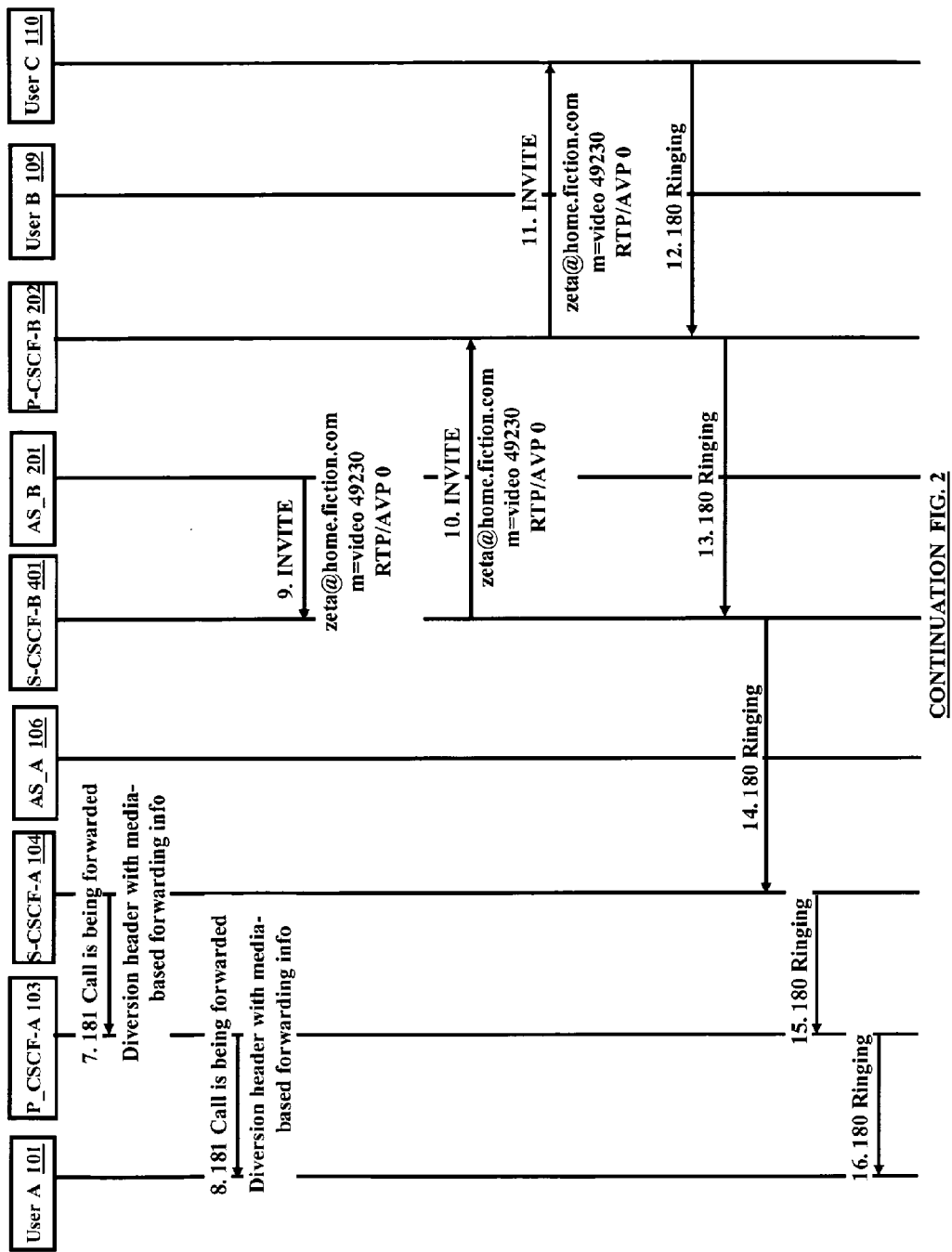

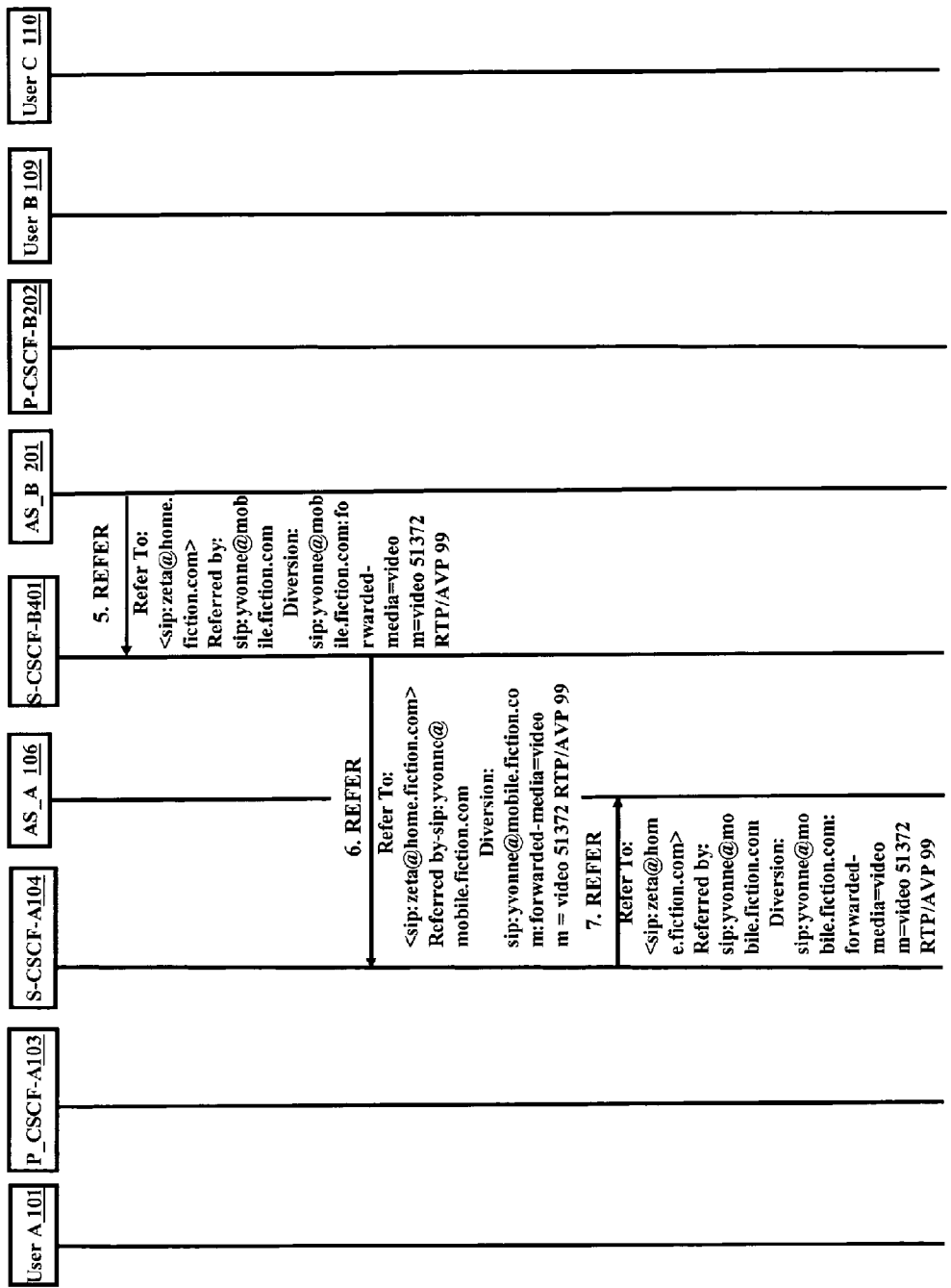
CONTINUATION FIG.4

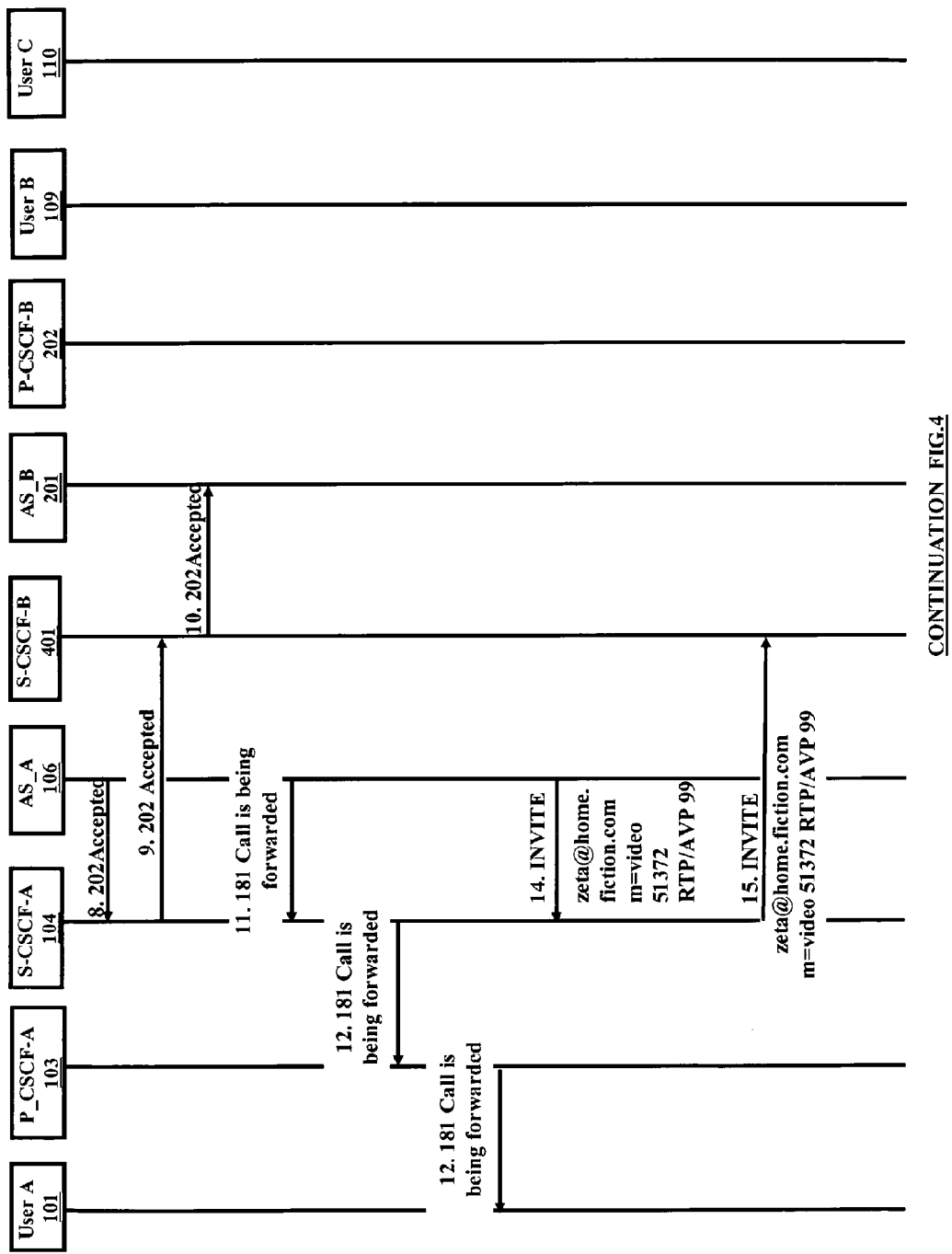

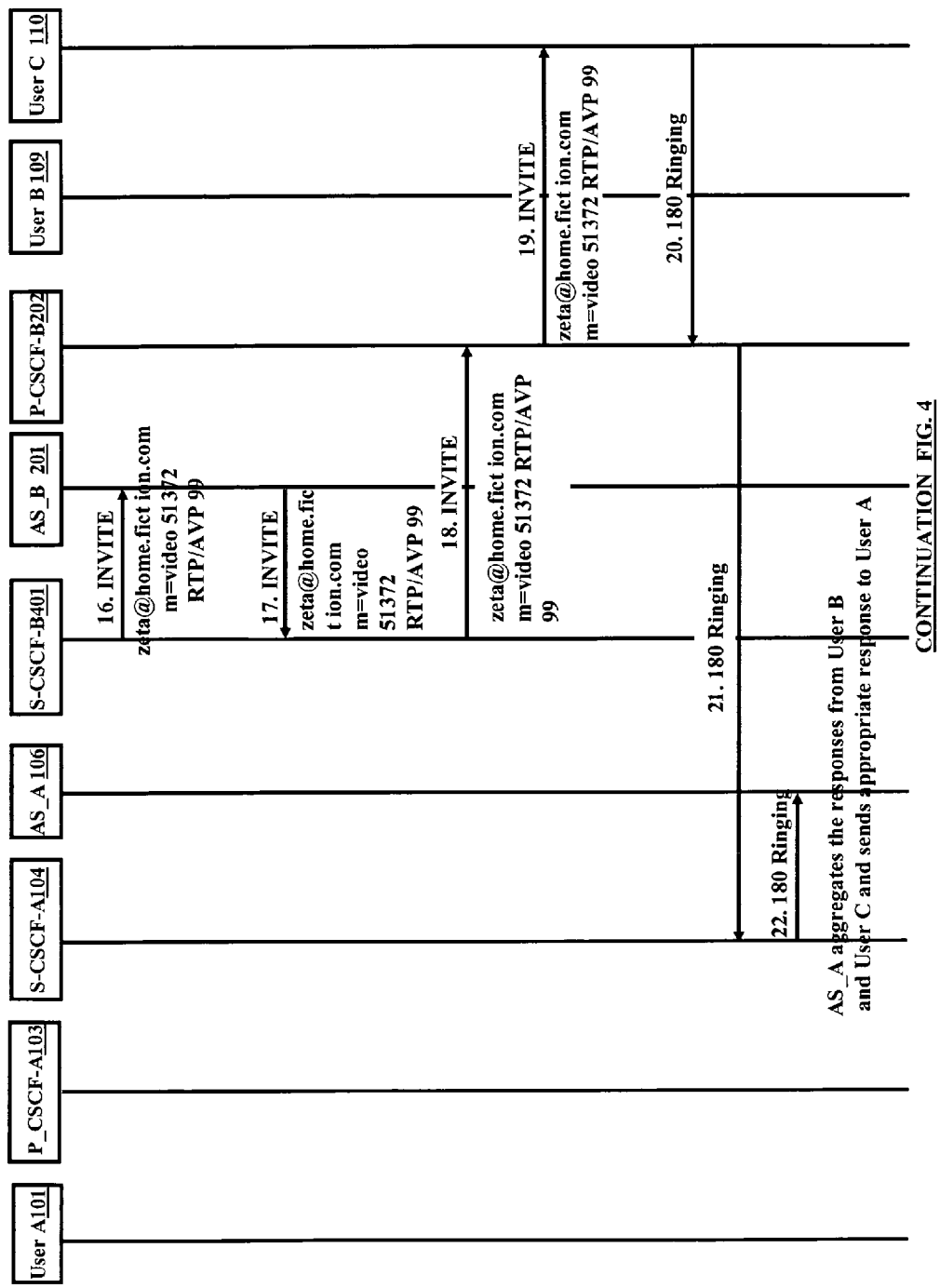

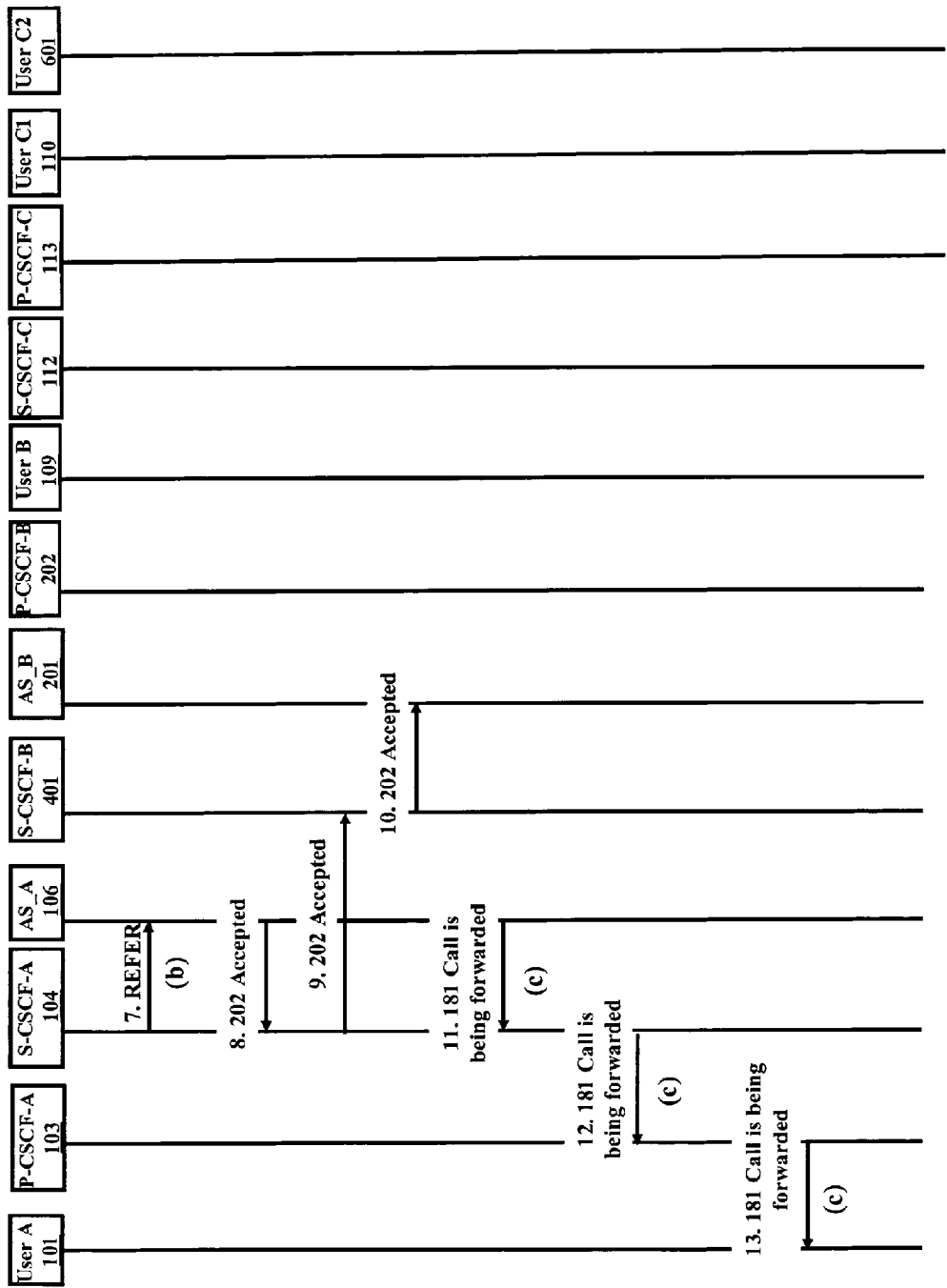

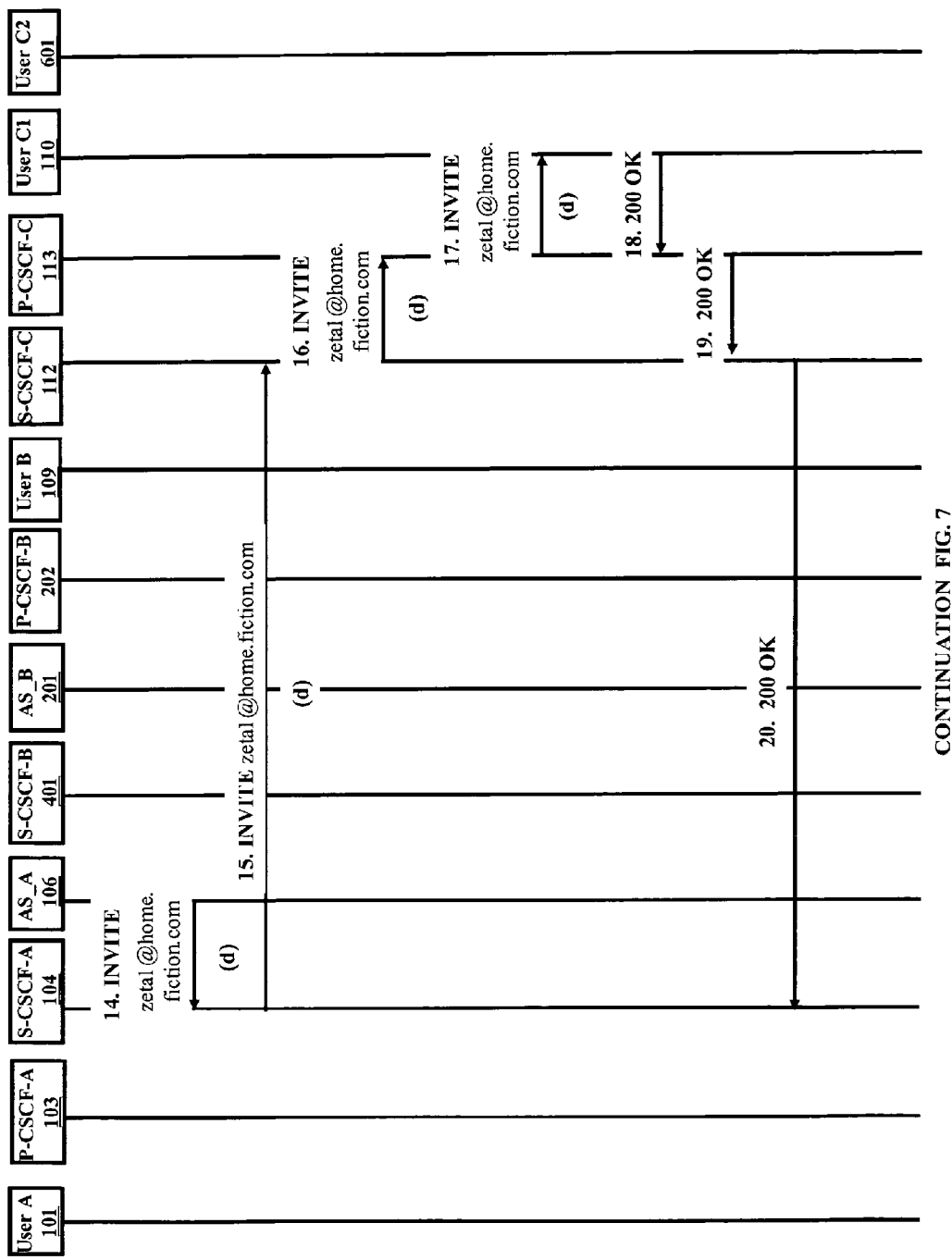

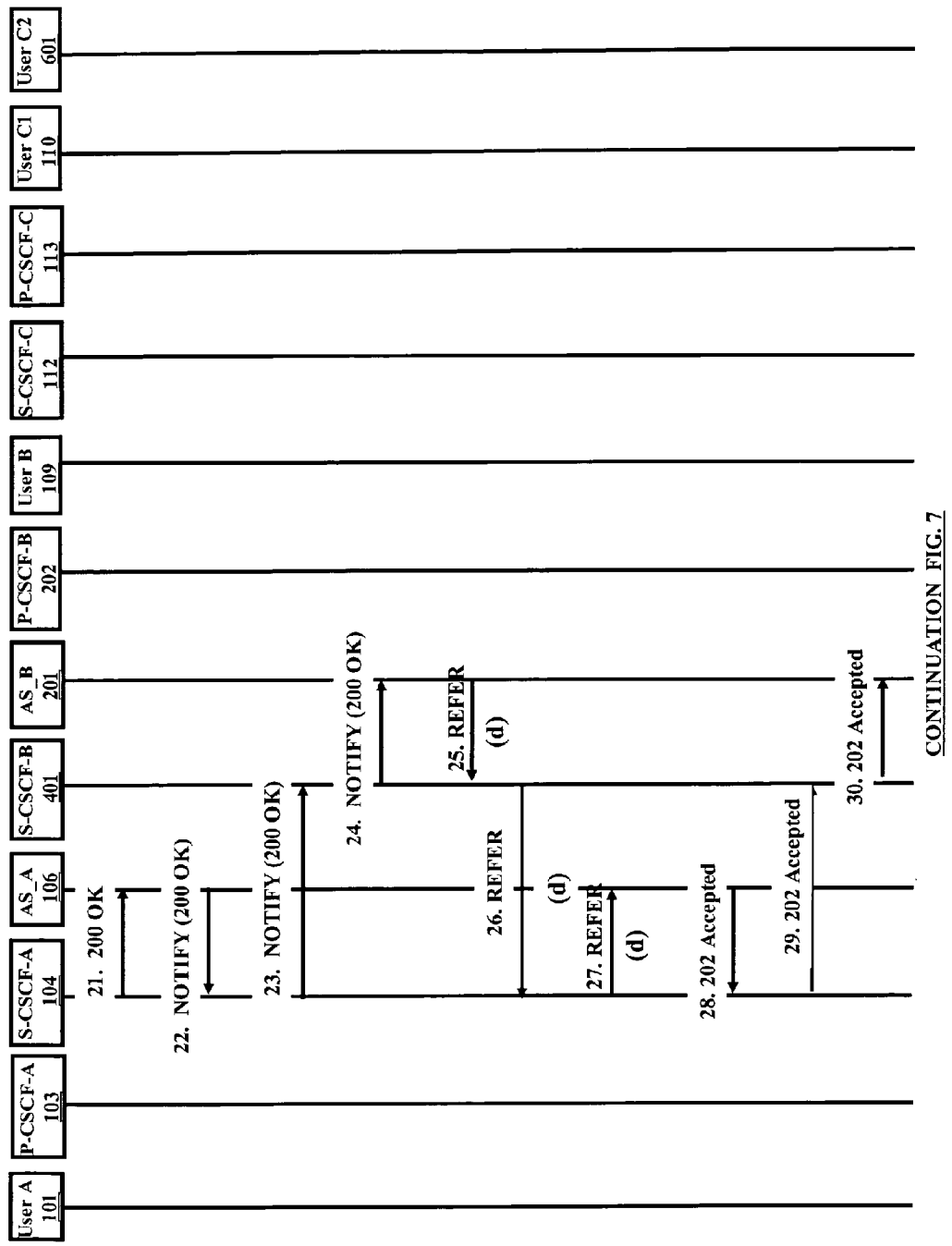

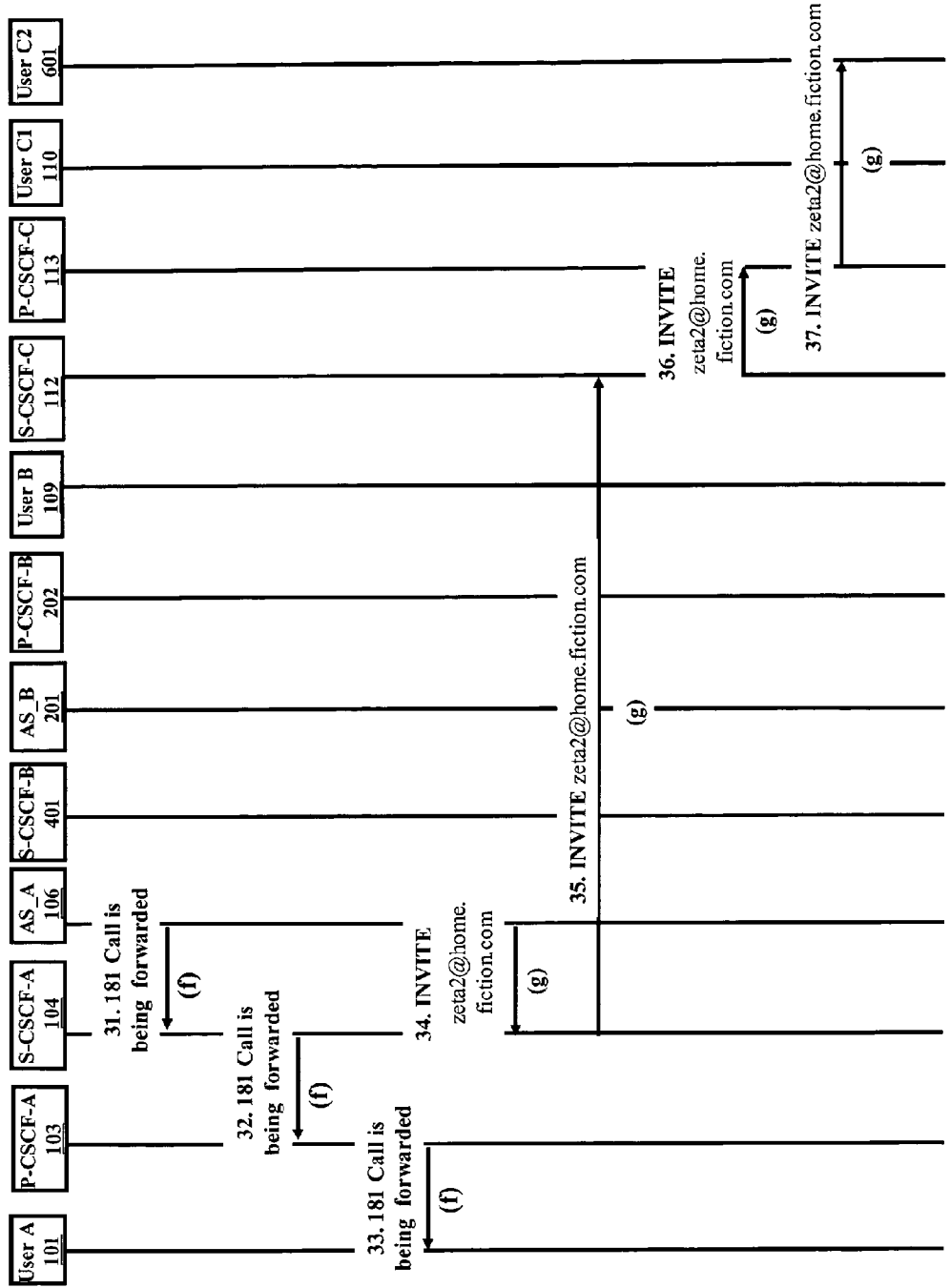

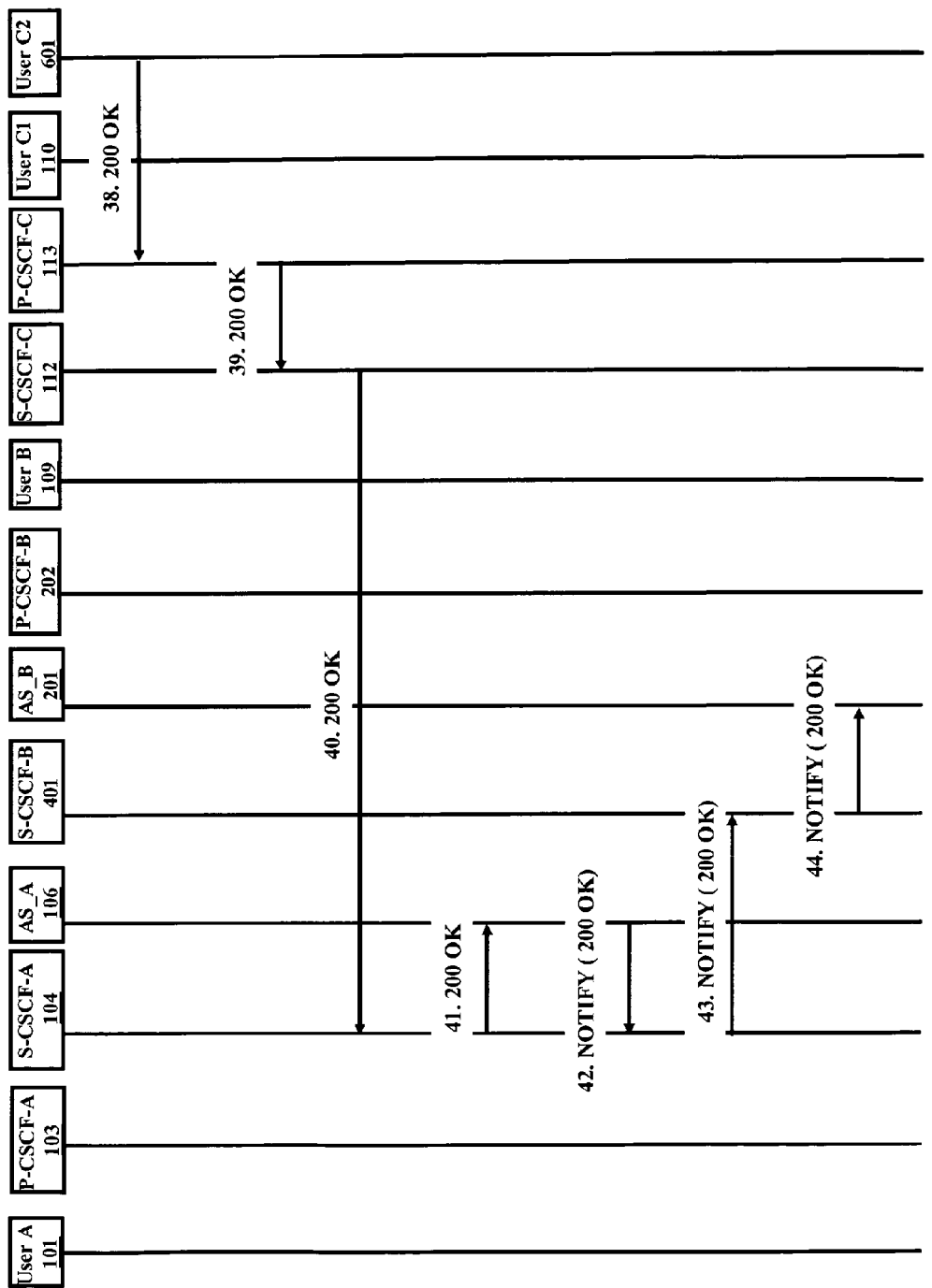

(a) = m= audio 49170 RTP /AVP 0
m = video 51372 RTP/AVP 99

(b) = Refer to:
<sip:zeta1@home.fiction.com>
Referred by-
Sip:yvonne@mobilefiction .com
Diversion:
sip:yvonne@mobilefiction.com;reason=unconditional,
forwarded media
m = video 51372 RTP/AVP 99

(c) = Diversion header wit h media-
based partial forwarding info (d) = m=video 51372 RTP/AVP 99

(e) = Refer to:
<sip:zeta2@home.fiction.com>
Referred by-
Sip:yvonne@mobilefiction .com
Diversion:
sip:yvonne@mobilefiction.com;reason=unconditional,
forwarded media
m = audio 49170 RTP/AVP 0

(f) = Diversion header wit h media-based
partial forwarding info (g) = m= audio 49170 RTP /AVP 0

CONTINUATION FIG. 7

METHOD AND SYSTEM FOR SELECTIVE CALL FORWARDING BASED ON MEDIA ATTRIBUTES IN TELECOMMUNICATION NETWORK

BACKGROUND

1. Technical Field

The embodiments disclosed herein generally relate to telecommunication networks, and, more particularly, to providing call forwarding services based on Session Description Protocol (SDP) attributes.

2. Description of the Related Art

The recent advances in telecommunications technology provide a wide array of special telecommunication services to subscribers. The services include basic call setup, enhanced call services such as call forwarding, call screening, geographic call routing, flexible call routing, calling party name/number display, three-way calling, accounting and billing, flexible carrier selection and the like. To enable advanced telecommunication services, telecommunications networks generally carry signals as well as the voice or data comprising the conversation between the calling party and the called party.

In telecommunications networks, call forwarding (CF) functionality allows users to forward incoming calls to an alternate number of user's selection when the status of the called end is busy line, or no reply, or unconditional call forwarding and so on. In general, call forwarding process involves accessing a database, retrieving call forwarding information from the database and using the retrieved call forwarding information to forward the call to the desired final destination. In first and second generation wireless system, the number of successive times a call can be forwarded is limited to avoid overloading of the network due to bandwidth constraints. The third generation wireless systems support higher bandwidth access by arranging more complex processing in network elements, so that it provides multimedia, new value-added services and use new interfaces.

IP Multimedia Subsystem (IMS) uses the advantage of IP networks to provide traditional supplementary services, such as call forwarding, conferencing, and call waiting for subscribers on an IMS platform. IMS defines the standard Session Initiation Protocol (SIP) interface between application servers; the IMS core network Call Session Control Function (CSCF), and the IMS subscriber. The interface between CSCF and the database, the Home Subscriber Server (HSS), and between an AS and HSS is based on the DIAMETER protocol. There are a number of call forwarding services such as call forwarding on busy, call forwarding on no reply, call forwarding unconditional, selective call forwarding and so on in both traditional networks like Public Switched Telephone Network (PSTN)/Public Land Mobile Network (PLMN); and new age networks like Next Generation Network (NGN) and SIP based networks. Also, many new data services, such as instant messaging, video calls, video on wait, and web-based services, are also be available for the IMS subscribers.

However, the call forwarding services in case of IMS subscribers in use today may be based on called subscriber's line status and calling subscriber's identity. The current methods provides no call forwarding services for IMS/SIP user's based on media attributes, network based evaluation of SDP or partial call forwarding. Furthermore, there is no call forwarding based on session attributes, such as, whether the call is an audio or video call, the call is of low bandwidth or high bandwidth, or a certain codec type is supported/available or not by the device. For instance, if the called user is in a visited network where high bandwidth calls may not be advisable due to cost, QoS or the like, possible to forward the calls to a Multimedia platform. Further, if the user have a hand-held device that supports only certain type of RTP streams, then for example, forwarding video calls to the house would be convenient.

SUMMARY

In view of the foregoing, an embodiment herein provides a method of forwarding a call received by a user of a telecommunications network on basis of media attributes of the call, the method comprising steps of:

comparing the received Session Description Protocol (SDP) parameters with call forwarding parameters of the (served) user, forwarding the call to a second terminal, as specified in the call forwarding parameters, if one of the SDP parameters matches with the call forwarding parameters, sending a REFER message to network of calling user, wherein the REFER message comprises part of the SDP to be forwarded and a unique identifier for the second terminal, wherein part of the SDP to be forwarded is determined by profile of the user and the SDP, and the network of the calling user (or the calling user's terminal itself) initiating a call to the second terminal on receipt of the REFER message.

The SDP parameters can comprise of, for instance, "m=" line, "b=AS:" line, "b=TIAS:" line, and "a=rtpmap" line. The "m=" line of SDP indicates an audio or video call, a low bandwidth or high bandwidth call is indicated in the "b=AS" line of SDP or "b=TIAS:", "a=maxprate:" and the codec type is supported or available or not is indicated by "a=rtpmap" line of SDP. The telecommunications network can be one of a Session Initiation Protocol (SIP)-based network or an Internet Protocol (IP) Multimedia Subsystem (IMS) network. In case of an IMS network, the method is performed by at least one of an Application Server (AS) and a Serving-Call Session Control Function (S-CSCF) of the user. In case of a SIP-based non-IMS network, the actions performed by the AS/S-CSCF are typically performed by a SIP Proxy.

The part of the SDP to be forwarded is determined by comparing the profile of the served user and the received SDP, and, on obtaining a match between at least one of the received SDP parameters and the call forwarding parameters, sending the (multiple) REFER messages to the network of calling user. The network of the calling user initiates calls to a plurality of terminals on receipt of such REFER messages, wherein the call setup messages (to the plurality of terminals) containing the SDP as received in the corresponding REFER messages.

Embodiments herein further disclose a system adapted to perform a method of forwarding a call received by a user of a telecommunications network on basis of media attributes of the call, the system comprising at least one means to compare parameters of Session Description Protocol (SDP) with call forwarding parameters of the called user and to forward the call to a second terminal, as specified in the call forwarding parameters, if one of the SDP parameters match with the call forwarding parameters, the system comprising at least one means to send a REFER message to network of calling user, wherein REFER message comprises part of SDP to be forwarded and a unique identifier for the second terminal, wherein part of SDP to be forwarded is determined by comparing profile of the called user and the received SDP info (from the calling user), and, on obtaining a match between at least one of the SDP parameters and call forwarding parameters of the called user, send a REFER message to the network of the calling user with the SDP to be forwarded. On reception of such a REFER message, the network of the calling user sends an INVITE to second terminal as specified in REFER message, to initiate a call to the second terminal on receipt of such a REFER message.

Embodiments further disclose a system adapted to perform partial forwarding of calls to a plurality of terminals, the system comprising at least one means to send a plurality of REFER messages to network of calling user, wherein number of REFER messages is equal to number of terminals to which calls have to be forwarded, wherein the REFER message comprises part of SDP to be forwarded and a unique identifier for the terminals, wherein part of the SDP to be forwarded is determined by call forwarding parameters in the profile of the called user and the received SDP, and on obtaining match between at least one of the received SDP parameters and the call forwarding parameters of the user. The network of the calling user initiates a call to a plurality of terminals by sending a INVITE to plurality of terminals as specified in the corresponding REFER messages.

Embodiments further disclose a module adapted to perform forwarding a call received by a user of a telecommunications network on basis of media attributes of the call, the module comprising at least one means to take a decision if call forwarding is to be done after obtaining a match between SDP parameters to decide if the call forwarding is to be done, to send a REFER message to network of calling user if call forwarding is partial and media based and to send a plurality of REFER messages to network of calling user, if call forwarding is partial and media based to multiple users.

These and other aspects of the embodiments disclosed herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments disclosed herein without departing from the spirit thereof, and the embodiments disclosed herein include all such modifications.

BRIEF DESCRIPTION OF THE DRAWINGS

The embodiments disclosed herein will be better understood from the following detailed description with reference to the drawings, in which:

FIG. 2 illustrates a schematic diagram depicting the call flow for call forwarding based on media attributes, according to an embodiment herein;

DETAILED DESCRIPTION OF EMBODIMENTS

Figure 1:
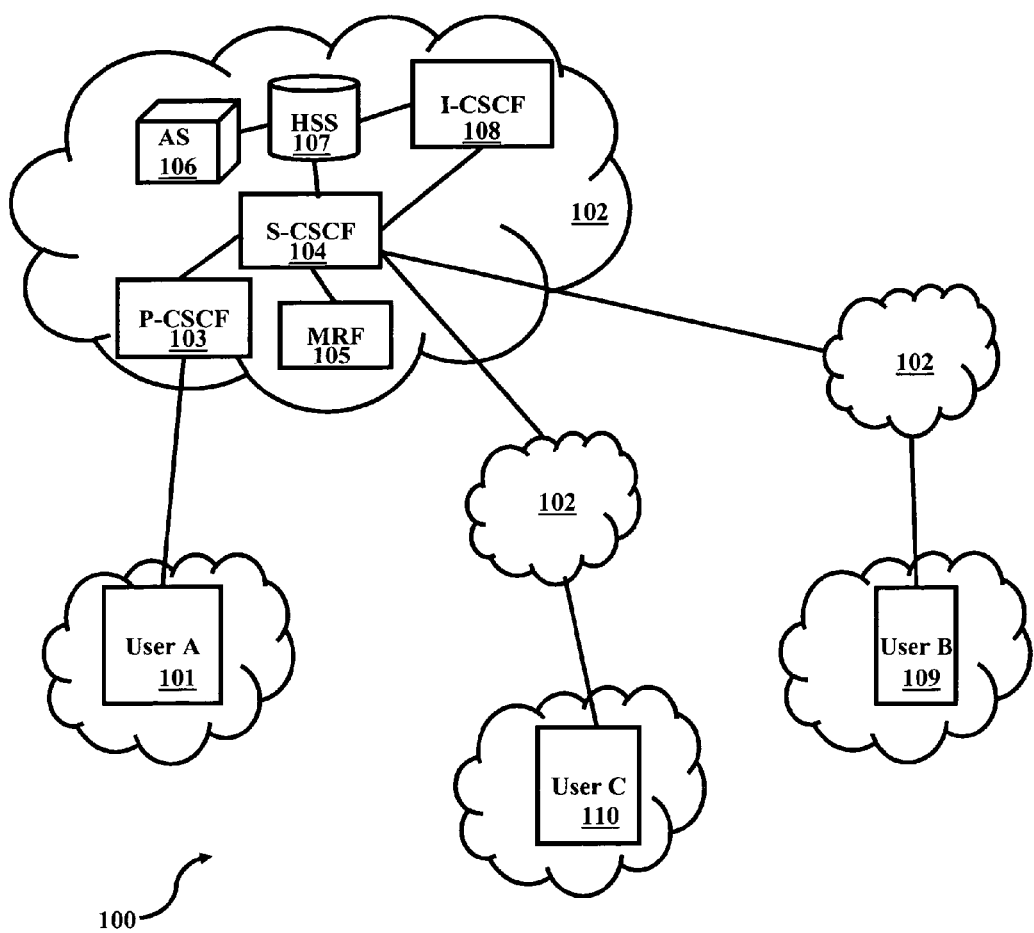
FIG. 1 is a block diagram showing an exemplary illustration of a network topology with the involved network elements in a telecommunications network, according to an embodiment herein.

The embodiments disclosed herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments disclosed herein. The examples used herein are intended merely to facilitate an understanding of ways in which the embodiments disclosed herein may be practiced and to further enable those of skill in the art to practice the embodiments disclosed herein. Accordingly, the examples should not be construed as limiting the scope of the embodiments disclosed herein.

Embodiments herein disclose methods and systems to enhance call forwarding services comprising call forwarding on busy, call forwarding on no reply, call forwarding unconditional, selective call forwarding and the like based on media attributes and network evaluation of session description protocol (SDP). Referring now to the drawings, and more particularly to FIGS. 1 through 8, where similar reference characters denote corresponding features consistently throughout the figures, there are shown embodiments.

FIG. 1 is a block diagram showing an exemplary illustration of a network topology with the involved network elements in a telecommunications network, according to an embodiment herein. User A 101 is connected via an access network to Proxy Call-Session Control Function (P-CSCF) 103. The IP multimedia subsystem (IMS) network 102 comprises Proxy Call Session Control Function (P-CSCF) 103, Serving—call session control function (S-CSCF) 104, Application server (AS) 106, Home Subscriber Server (HSS) 107, Media Resource Function (MRF) 105, and Interrogating-Call Session Control Function (I-CSCF) 108. The P-CSCF 103 provides interface between the IMS network 102 and calling User A 101 and provides IP addresses and other variables to establish IP sessions. The S-CSCF 104 provides session control for subscriber accessing call services within an IMS network 102. A MRF 105 connected to S-CSCF 104 provides media related functions such as media manipulation, for example, voice stream mixing and playing of tones and announcements in IMS network 102. The AS 106 hosts and executes services. The AS 106 also executes the media based called call forwarding service logic. The AS interfaces with the S-CSCF 104 using Session Initiation Protocol (SIP). The HSS 107 is the user database which includes the user profiles and aids in performing authentication and authorization of the calling User A 101. The I-CSCF 108 queries the HSS 107 using an interface to retrieve the user location, and to determine the S-CSCF 104 for a user, during registration, and for incoming requests (wherein the user is the called party).

FIG. 2 illustrates a schematic diagram depicting the call flow for call forwarding based on media attributes, according to an embodiment herein. User A 101 initiates a call towards User B 109 by sending an INVITE request message, where the INVITE request message comprises a SDP and a destination address, where the SDP has the call attributes including type of call, bandwidth and specific codecs required for the call. An audio or video call may be indicated by the "m=" line of SDP. A low bandwidth or a high bandwidth call may be indicated in the "b=AS:" line of SDP or "b=TIAS:", "a=maxprate:" lines of SDP. A certain codec type is supported/available or not may be indicated by "a=rtpmap" line of SDP. The terminating Application Server (AS_B) 201 which has the profile of User B 109 identifies if User B 109 has media-based call forwarding to User C 110. The AS_B 201 checks for call forwarding parameters, for example the "m" parameter, of the SDP content received in the INVITE message towards User B 109. If the SDP parameter matches with the indication in the user profile, the AS_B 201 triggers the call forwarding and notifies User A 101 by sending a 181 call is being forwarded message, to inform that the call is being forwarded. The 181 call is being forwarded message comprises diversion header with media-based forwarding information.

Figure 3:
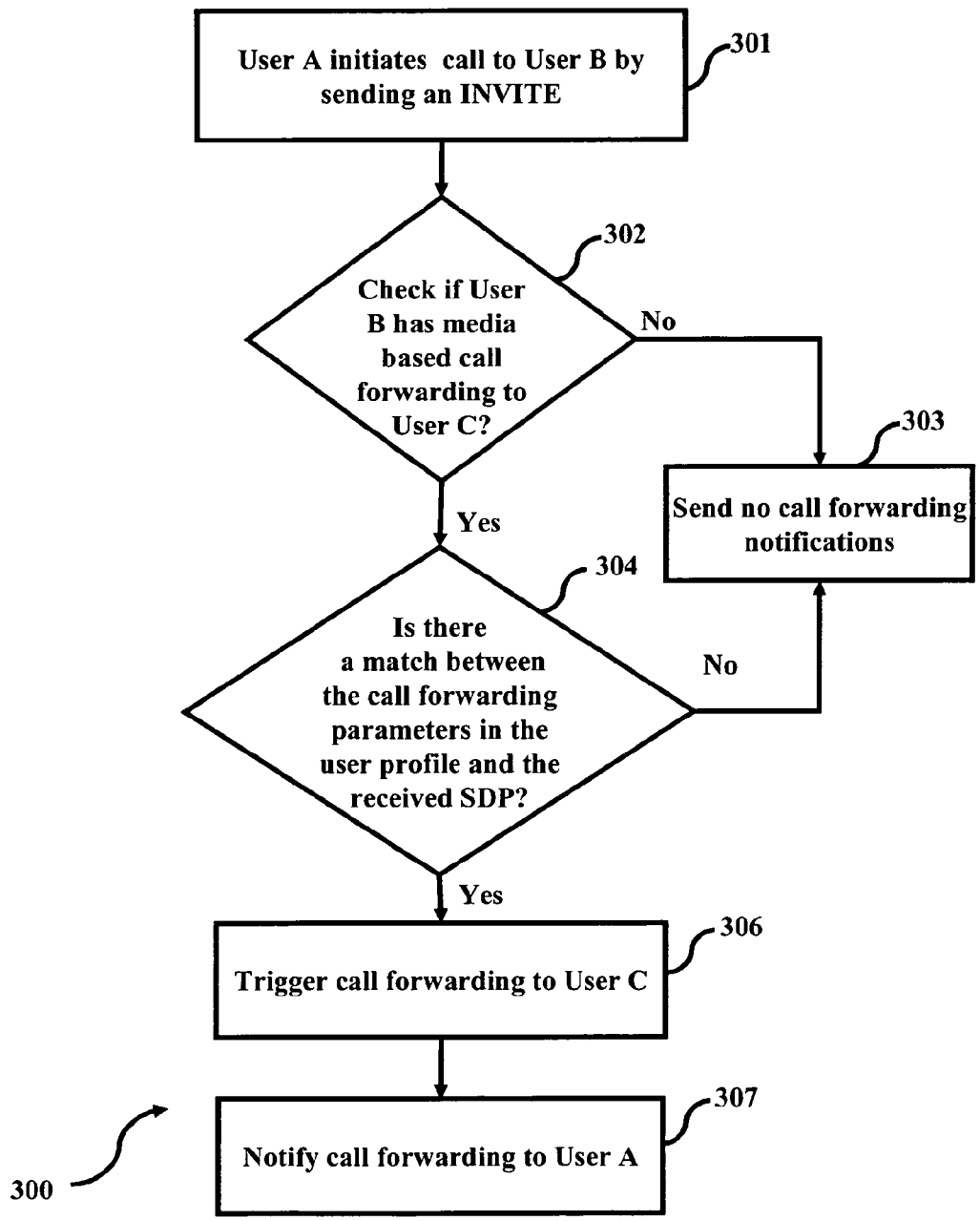
FIG. 3 illustrates a flowchart depicting a method of processing media based call forwarding in a telecommunications network, according to an embodiment herein.

FIG. 3 illustrates a flowchart depicting a method of processing media based call forwarding in a telecommunications network, according to an embodiment herein. The User A 101 initiates (301) a call towards User B 109 by sending an INVITE message, wherein the INVITE request message comprises an SDP and a destination address, where the SDP has the call attributes including type of call, bandwidth and specific codecs required for the call. The terminating AS_B 201 checks (302) if User B 109 has media-based call-forwarding to User C 110. If User B 109 has no media-based called forwarding, then no call forwarding notification is sent (303) to User A 101 and the standard call set up proceeds. If User B 109 has media-based call forwarding, the AS_B 201 then performs (304) a further check if the call forwarding parameters in the user profile match with the parameters of SDP received in the INVITE message from User A 101 towards User B 109. For example, the SDP parameters can be "m", "a", "b, and the like. An audio or video call may be indicated by "m=" line of SDP. A low bandwidth or a high bandwidth call may be indicated in the "b=AS:" line of SDP or "b=TIAS:", "a=maxprate:" lines of SDP. A certain codec type is supported/available or not may be indicated by "a=rtpmap" line of SDP. If the SDP parameter(s) does not match, then no call forwarding notification is sent (303) to User A 101 and the standard call set up proceeds. If the SDP parameter(s) matches, then AS_B (201) triggers (306) the call forwarding towards User C 110. Further, the AS_B 201 notifies (307) User A 101 of the call forwarding by sending a 181 Call is being forwarded message, which can contain information about the reason for the call being forwarded, and if applicable additional info on the media being forwarded in the body of the 181 response message. The various actions in method 300 may be performed in the order presented, in a different order, or simultaneously. Further, in some embodiments, some actions listed in FIG. 3 may be omitted.

Figure 4:
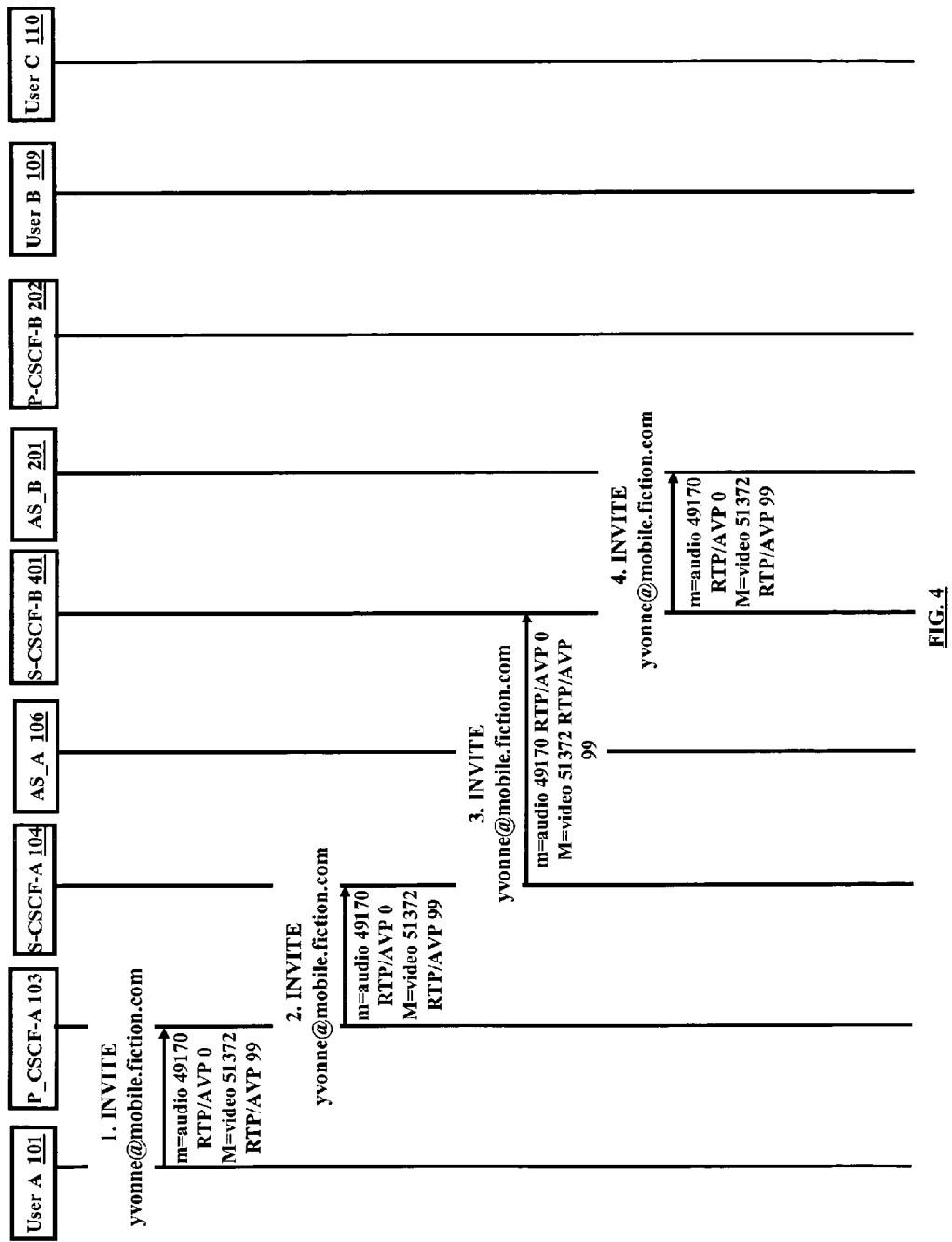
FIG. 4 illustrates a schematic diagram depicting the call flow for partial call forwarding based on media attributes, according to an embodiment herein.

FIG. 4 illustrates a schematic diagram depicting the call flow for partial call forwarding based on media attributes, according to an embodiment herein. User A 101 initiates a call towards User B 109 by sending an INVITE message, where the INVITE request message comprises a SDP and a destination address, where the SDP has the call attributes which may include type of call, bandwidth and specific codecs required for the call. User B 109 has partial call forwarding active for video media to User C 110. The Application Server of User B (AS_B) 201 accepts the INVITE message and subsequently, sends a REFER with delta SDP back from the AS_B 201 to Serving-Call Session Control Function (S-CSCF-B) 401. The S-CSCF-B 401 then sends the REFER to S-CSCF-A 104. The S-CSCF-A 104 further sends the REFER to AS_A 106. The AS_A 106 then sends a 202 Accepted to S-CSCF-A 104 and S-CSCF-A 104 then sends 202 Accepted to S-CSCF-B 401 and further to AS_B 201. A 181 Call is being forwarded message is sent back to User A 101 indicating the details on the forwarded call. If the REFER sent by AS_B 201 contains the diversion header with media-based partial forwarding information, then this information is copied over to the 181 response message to notify User A 101 (via S-CSCF_A (104) and P-CSCF_A (103)). The Application Server of User A (AS_A) 106 then sends a new request INVITE message using the information received in REFER to S-CSCF-A 104. S-CSCF-A 104 then sends the request to S-CSCF-B 401 and, in turn to AS_B 201 and subsequently to P-CSCF-B 202. P-CSCF-B 202 then sends the INVITE to User C 110 specified in the REFER. User C 110 accepts the request and responds by sending a 180 ringing response back. The 180 ringing response reaches AS_A 106, which would have also received the 180 Ringing (or 200 OK) from User B (if not received earlier, it would wait for reception), and then aggregates the backward responses (particularly the SDP info present in the body of the responses), and sends appropriate backward responses back to User A 101 via the 5-CSCF-A 104 and P-CSCF-A 103. The call set up between User A 101 and User B 109, and User A and User C 110 is then completed successfully. Later, when the call/session ends, AS_A ensures that the resources at all the involved users/terminals (A, B and C) are properly freed. In the given illustration, S-CSCF, AS and P-CSCF of User B and User C are the same. However, User C's P-CSCF, S-CSCF and AS can also be different from those of User B. It is obvious to a person skilled in the art that the S-CSCF-A 104 may carry out the tasks carried out by AS_A 106 as described herein.

Figure 5:
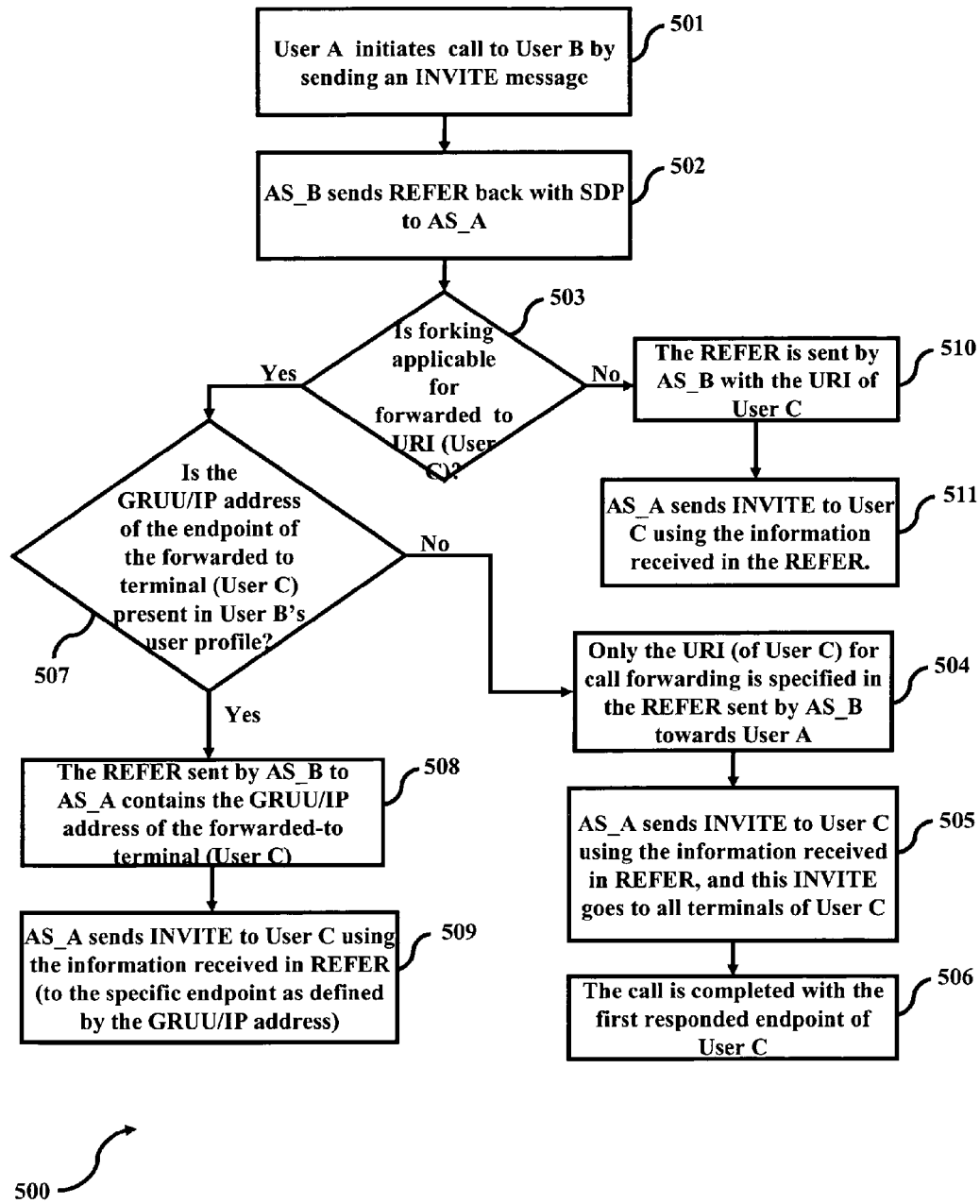
FIG. 5 illustrates a flowchart depicting a method of processing media based partial call forwarding in a telecommunications network, according to an embodiment herein.

FIG. 5 illustrates a flowchart depicting a method of processing media based partial call forwarding in a telecommunications network, according to an embodiment herein. User A 101 initiates (501) a call by sending an INVITE message to User B 109, where the INVITE request message comprises a SDP and a destination address, wherein the SDP has the call attributes which may include type of call, bandwidth and specific codecs required for the call. AS_B 201 accepts the request and sends (502) back REFER with delta SDP to AS_A 106. Before sending the REFER, AS_B 201 checks (503) if the forwarded-to URI (User C) has forking applicable or not. Forking refers to the splitting up of a call to multiple terminals, when multiple terminals are associated with a URI. If the forwarded-to URI has no forking applicable, then AS_B 201 simply specifies (510) the URI of User C for (partially) forwarding the call. The REFER sent by AS_B 201 reaches AS_A, which then sends the INVITE (511) towards User C 110 using the information received in the REFER. If the forwarded-to URI has forking applicable, then AS_B 201 checks (507) if User B 109 had earlier updated its profile to include the GRUU or the IP address of the forwarded-to terminal (User C). If the GRUU or the IP address of the forwarded-to user is present in User B's profile, then this information is then included by AS_B in the REFER (508) sent towards AS_A 106 Further, the AS_A 101 then sends (509) a new INVITE request to the User C 110 using the information received in the REFER to set up the call. If the forwarded-to URI has forking applicable, but User B's profile does not have information of the GRUU or the IP address of the forwarded-to user, then the AS_B 201 sends the REFER (504) with only the URI of User C towards AS_A 106. AS_A 106 then sends the INVITE (505) to User C, which is received by all the terminals of User C. The call towards User C 110 is completed (506) with the first endpoint sending the proper 200 OK towards User A 101 (and accepted by it). The message flow described between AS_A 106 and AS_B 201 actually takes place via S-CSCF_A 104 and S_CSCF_B 401. The various actions in method 500 may be performed in the order presented, in a different order, or simultaneously. Further, in some embodiments, some actions listed in FIG. 5 may be omitted.

Figure 6:
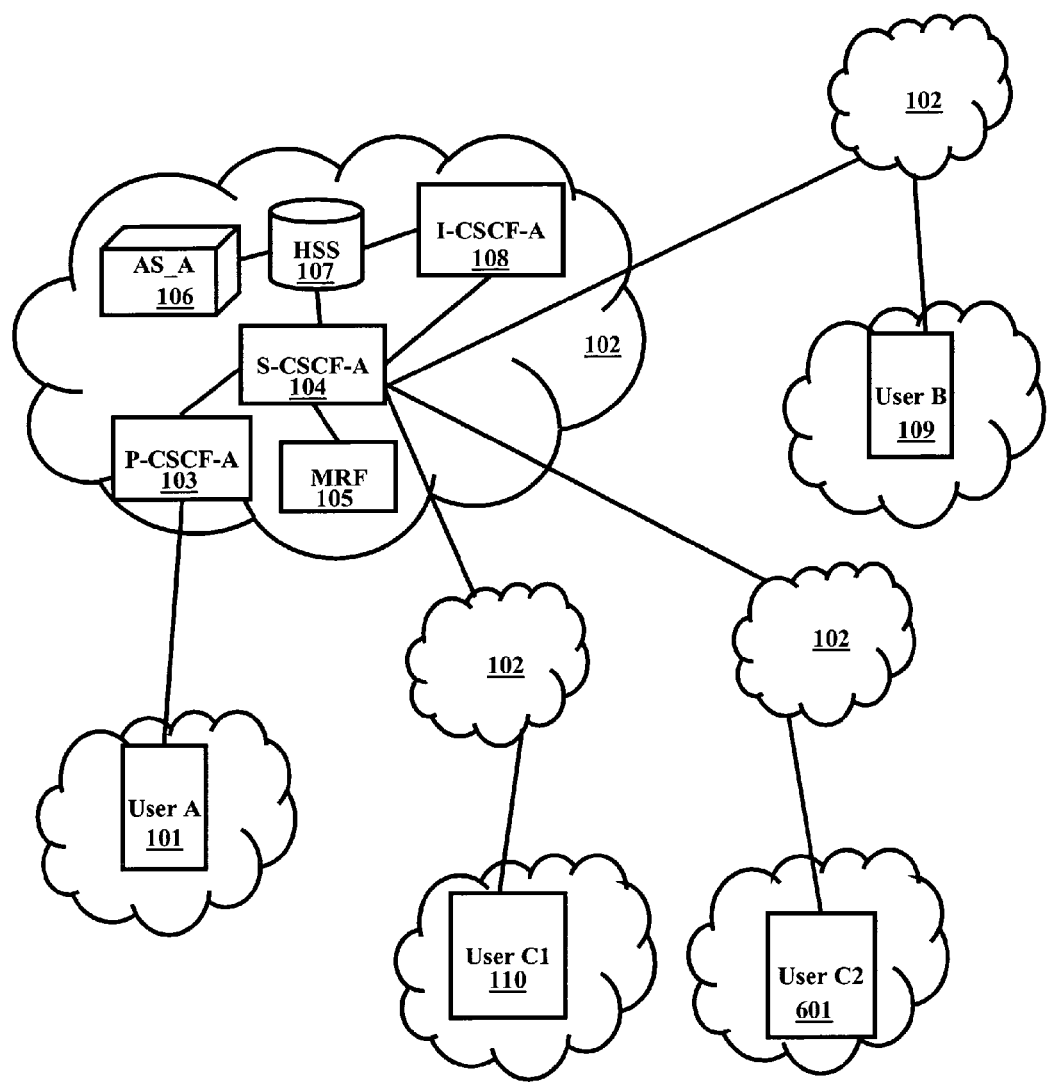
FIG. 6 illustrates a block diagram showing an exemplary illustration of a network topology with the network elements involved in partial call forwarding to multiple destinations in a telecommunications network, according to an embodiment herein.

FIG. 6 illustrates a block diagram showing an exemplary illustration of a network topology with the network elements involved in partial call forwarding to multiple destinations in a telecommunications network, according to an embodiment herein. The User A 101 is connected via an access network to Proxy Call-Session Control Function (P-CSCF) 103. The IP multimedia subsystem (IMS) 102 comprises network elements, such as serving—call session control function (S-CSCF) 104, Application server (AS) 106, Home Subscriber Server (HSS) 107, Media Resource Function (MRF) 105, and Interrogating-Call Session Control Function (I-CSCF) 108. The P-CSCF-A 103 provides interface between the IMS 102 and calling User A 101 and provides IP addresses and other variables to establish IP sessions. The S-CSCF1 104 provides session control for subscriber accessing call services within an IMS 102. A MRF 105 connected to S-CSCF1 104 provides media related functions such as media manipulation, for example, voice stream mixing and playing of tones and announcements in IMS 102. The AS-A 106 hosts and executes services. The AS-A 106 also executes the media based call forwarding service logic. AS-A 106 interfaces with the S-CSCF 104 using Session Initiation Protocol (SIP). The HSS 107 is the user database which includes the user profiles and aids in performing authentication and authorization of the calling User A 101. The I-CSCF-A 108 then queries the HSS 107 using an interface to retrieve the user location and to determine the S-CSCF 104 for a user, during registration, and for incoming requests (wherein the user is the called party). The application server AS-B 201 of User B 109 sends appropriate responses to User A 101 and subsequently exits the call set up actions. AS_A 106 then sets up a new call attempt towards the forwarded to users User C1 110 and User C2 601. In case of a SIP based non-IMS network, the functions performed by the application server can be performed by a SIP proxy. Further, in case of a SIP softphone the functions of S-CSCFs or Application servers can be performed by the end user's terminals themselves.

Figure 7:
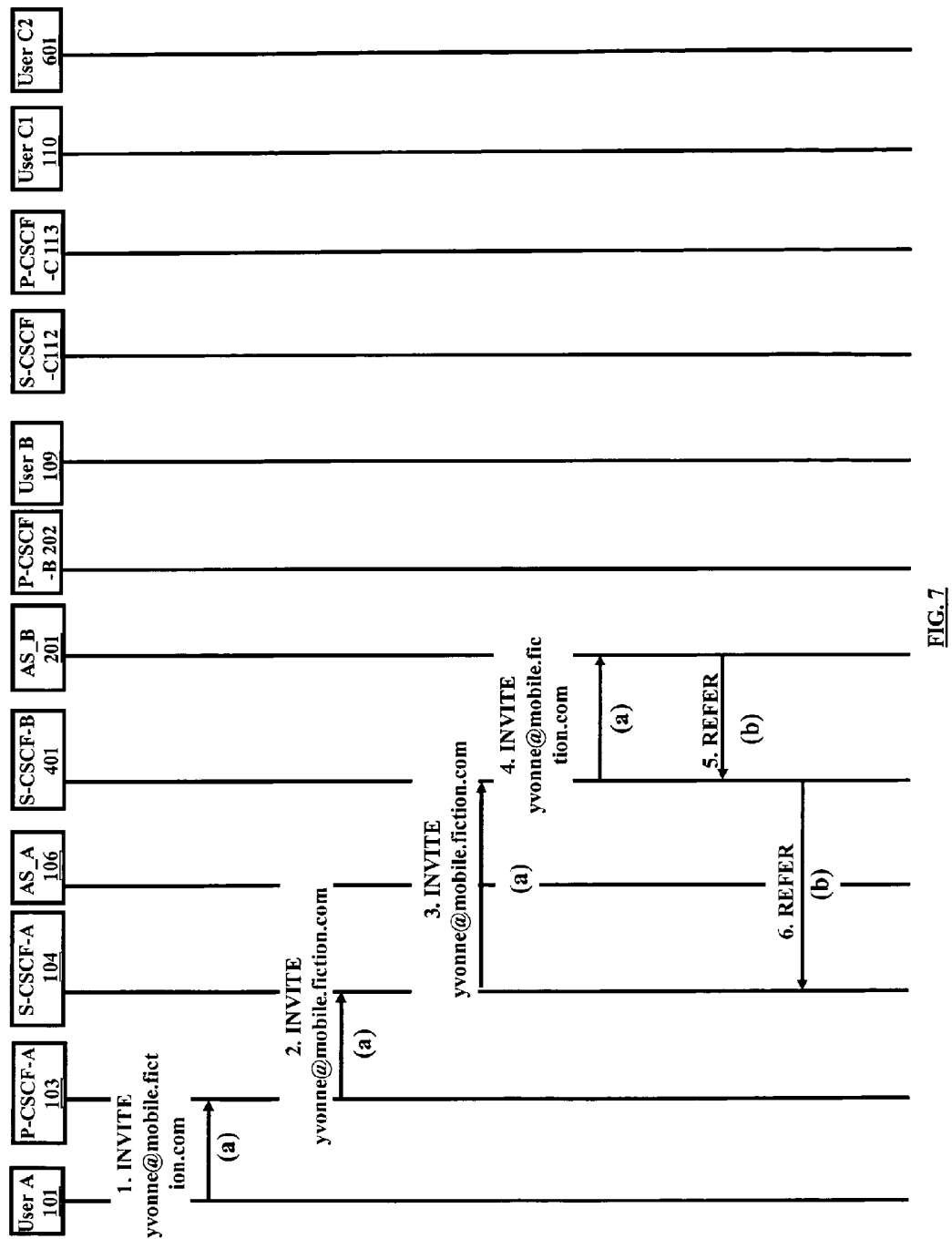
FIG. 7 illustrates a schematic diagram depicting the call flow for media-based call forwarding partially to multiple destinations, according to an embodiment herein.

FIG. 7 illustrates a schematic diagram depicting the call flow for media-based call forwarding partially to multiple destinations, according to an embodiment herein. User A 101 initiates a call towards User B 109 by sending an INVITE message, where the INVITE request message comprises a SDP and a destination address, where the SDP has the call attributes which may include info such as type of call, bandwidth and specific codecs required for the call. User B 109 has call forwarding unconditional active for video media to User C1 110 and audio media to User C2 601. The AS_B 201 accepts the INVITE message and sends a REFER with delta SDP back from the AS_B 201 to S-CSCF-B 401. The S-CSCF-B 401 further sends the REFER to S-CSCF-A 104. The S-CSCF-A 104 further sends the REFER to AS_A 106. The AS_A 106 then sends a 202 Accepted to S-CSCF-A 104 and S-CSCF-A 104 then sends 202 Accepted to S-CSCF-B 401 and further to AS_B 201. A 181 call is being forwarded message is sent by AS_B 201 to indicate the details of the forwarded call to User A 101. If the REFER contains the diversion header with media-based partial forwarding information then this information is copied over to the 181 response message to notify User A 101. The AS_A 106 then sends a new INVITE message to User C1 110 and User C1 110 accepts the request and sends a 200 OK back to S-CSCF-A 104 and further to AS_A 106 and the AS_A 106 sends a NOTIFY (200 OK) to AS_B 201 (through S-CSCF-A 104 and S-CSCF-B 401). After the first media is successfully forwarded, AS_B 201 sends a second REFER to forward the second media to User C2 601. AS_B 201 sends the REFER with SDP to AS_A 106 and AS_A 106 sends a 202 Accepted to AS_B 201 (the REFER and the 200 OK pass through the S-CSCF-A 104 and S-CSCF-B 401). If the diversion header with media-based partial forwarding information is transmitted in the REFER, then it is copied to the 181 call is being forwarded response and sent to User A 101. The AS_A 106 then sends an INVITE request to User C2 601. The User C2 601 accepts the call forwarding request and sends a 200 OK to AS_A 106. AS_A 106 then sends a NOTIFY with 200 OK as contents to S-CSCF-A 104. S_CSCF-A 104 in turn, sends this NOTIFY with 200 OK as contents to AS_B 201 via S-CSCF-B 401. Thus the AS_B 201 sends 2 REFER messages each containing the information for subsequent call set up towards Users (or terminals) C1 110 and C2 6013. After the second REFER is also handled, AS_B 201 sends a BYE to User A 101 and only the A-C1 and A-C2 connections are retained. The AS_A 106 aggregates the information received in the 18x/200 OK responses from Users C1 110 and C2 601, and sends the appropriate backward response towards User A 101. Subsequently, when the call/session ends, AS_A 106 ensures that the resources at the users/terminals involved (A, C1 and C2) are properly freed. In the scenario discussed above, it is possible that the 2nd REFER can be sent by AS-B 201 as soon as the 202 Accepted response is received for the 1st REFER from AS-A 106. The subscription of the service can be terminated by specifying the Subscription-State: terminated with reason=no resource in the NOTIFY 200 OK message.

Figure 8:
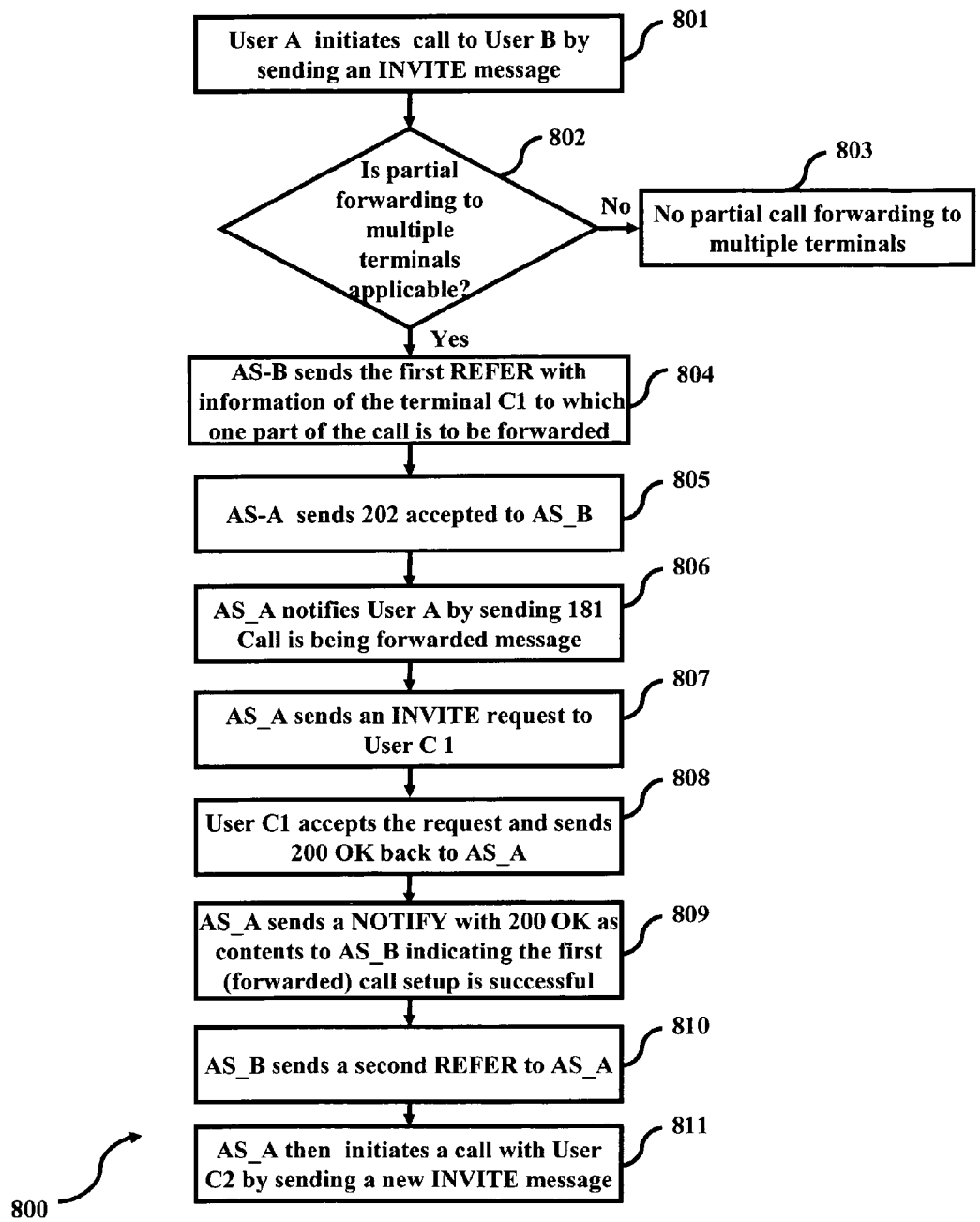
FIG. 8 illustrates a flowchart depicting a method of processing media based call forwarding partially to multiple destinations in a telecommunications network, according to an embodiment herein.

FIG. 8 illustrates a flowchart depicting a method of processing media based call forwarding partially to multiple destinations in a telecommunications network, according to an embodiment herein. User A 101 initiates (801) a call towards User B 109 by sending an INVITE message. User B 109 has call forwarding unconditional active for video media at User C1 110 and audio media to User C2 601. On reception of the INVITE, AS-B 201 checks (802) if (partial) call forwarding to multiple terminals is applicable for User B 109 or not. If User B 109 has partial call forwarding to multiple terminals applicable, then AS_B 201 specifies the endpoints for partially forwarding the call by sending REFER messages. The number of REFER sent is equal to the number of terminals/users the call is partially forwarded. In addition, the specification of endpoint(s) to forward the call is specified by User B when invoking the media based call forwarding service. AS-B specifies (804) the first endpoint for partially forwarding the call by sending the first REFER message. If User B 109 has no partial call forwarding applicable to multiple terminals, then no partial call forwarding to multiple terminals occurs (803). The AS_A 106 sends (805) 202 Accepted (in response to the REFER of Step 804) to AS_B 201. The SDP to be included in the REFER is determined by the User B's 109 profile information and the SDP received in the original INVITE message (in Step 801). AS_A 106 notifies (806) User A 101 the details of the forwarded call by sending a 181 Call is being forwarded message. If the REFER contains the diversion header with media-based partial forwarding information then this information is copied over to the 181 response message to notify User A 101. The AS_A 106 then sends (807) an INVITE request to User C1 110 and User C1 accepts (808) the request and sends 200 OK back to AS_A 106. AS_A 106 then sends (809) a NOTIFY with 200 OK as contents to AS_B 201 indicating the first (forwarded) call setup is successful. Further, AS_B 201 sends (810) a second REFER with delta SDP including information of the second terminal to which the call is to be forwarded to AS_A 106. AS_A 106 then initiates (811) a call set up with User C2 601 by sending a new INVITE using the information received in REFER. The second REFER may be sent by AS_B 201 to AS_A 106 as soon as it receives the 202 Accepted for the first REFER. Further, the message flow illustrated between AS_A 106 and AS_B 201 actually pass via S-CSCF-A 104 and S-CSCF-B 401. The various actions in method 800 may be performed in the order presented, in a different order, or simultaneously. Further, in some embodiments, some actions listed in FIG. 8 may be omitted.

An example illustrated in Table 1 provides a practical usage scenario, where a called user has call forwarding active based on media attributes of bandwidth session type and codec type.

TABLE 1

A practical usage scenario

| Bandwidth | Codec Type | Session Type | Destination |
|---|---|---|---|
| >2 Mbps | | | home1@xyz.com |
| <=2 Mbps | A | Video | home1@xyz.com |
| <=2 Mbps | B | Video | home1@xyz.com |
| <=2 Mbps | A | Audio | None |
| <=2 Mbps | A | Audio | None |

Several variations and extensions on the mentioned media attributes are possible in other embodiments. The embodiment can be used in conjunction with Call forwarding services, for example, call forwarding unconditional, call forwarding on busy, call forwarding on no reply, selective call forwarding and the like. The embodiment further allows user-defined combination of the listed call forwarding services along with the media-attributes, as shown in Table 2.

TABLE 2

A user-defined combination of the listed call forwarding services

| Time of Day | Served User State | Bandwidth | Session Type | Destination |
|---|---|---|---|---|
| 9AM-4PM | Busy | <2 Mbps | | Mobile1@xyz.com |
| 4PM-5PM | Unconditional | | Video | Home1@xyz.com |
| 5PM-8PM | No Reply | | Video | Home1@xyz.com |
| 8PM-9AM | Unconditional | | | Voicemail |

In other embodiments other attributes such as encryption may be used to determine the call forwarding. For example, the called user may forward all the calls which are not secure as indicated by SDP contents, to an endpoint in his home network, when the called user is in a visited network.

The embodiments disclosed herein, provides a method for call transfer by the end-user. Another embodiment, permits the called user to forward a part of the call, for instance, the video part to another terminal and also viewing it on the current terminal by provisioning the user profile and sending the appropriate contents in SDP in REFER. The SDP sent in REFER clearly indicates the media to be forwarded/transferred. The embodiment also permits to transfer back REFER to calling terminal to initiate the second INVITE to the new terminals for partial calls. In such a scenario, the Application Server AS_A does not process the REFER, and is also not concerned with ensuring the aggregation of responses to be sent to User A, and as well with the handling of BYE to ensure that resources are freed properly. Further, the embodiment allows the AS of called user (AS-B) to set up the partial call towards the second terminal.

In an embodiment disclosed herein, the REFER is transferred back up to calling terminal which then initiates the INVITES to the new terminals for the partial calls. The REFER contains the Delta SDP, i.e, the SDP to be forwarded, including the details of user to which (part of) the call is to be forwarded.

An example illustrated in Table 3 provides a practical usage scenario, of partially forwarding a call based on the served user's status and call session type. The REFER is transferred back to the calling user's network to initiate the INVITE to be sent to the forwarded-to terminal(s) to (partially) forward the call. In an embodiment discussed herein, the REFER(s) could also be sent back to User A's terminal which then initiates the INVITE to other terminal(s) for partially forwarding the call. If the calling user's (User A's) network handles the REFER and initiates the INVITE to the forwarded-to endpoint, then the 181 Call is being forwarded message is sent back to calling user indicating the details on the forwarded call. The REFER sent from the called user's (User B's) network contains the diversion header with media-based partial forwarding information and the information is copied over to the 181 response message to notify the calling user.

TABLE 3

A list of partial call forwarding based on media attributes

| Time of Day | Served User State | Session Type | Partial | Destination |
|---|---|---|---|---|
| 9AM-5PM | Busy | Video | Yes | Mobile1@xyz.com |
| | | Audio | Yes | Mobile2@xyz.com |
| 5PM-9AM | Unconditional | Video | No | Homephone1@xyz.com |

The partial indication signifies whether only the specific media part of the call is to be forwarded or the complete call is to be forwarded that meets the served user state condition and contains the specified session type.

In the embodiments disclosed herein, the Application Server (AS) of User A 101 decides the handling of message flow if the forwarded-to destinations have many type of call forwarding service active. For example, a media-based forwarding by User B 109 to User C 110 followed by partial call forwarding to multiple destinations D and E, would lead to REFER first sent by User B 109's AS, then 2 REFERs by User C 110's AS. The REFERs are handled by User A 101's AS and appropriate notifications are provided to User A 101.

In the embodiment disclosed herein, media-based partial forwarding information is also transported as a part of the diversion header. The embodiment provides a method to extend the diversion information to include information about the media-based forwarding, for example, because of video or bandwidth the call is being forwarded, can be sent in the 181 response.

The SDP attributes described for example, m="", "b=AS", and the like are some possible attributes that can be included in media based call forwarding. The attributes can be extended to any media related attribute of SDP, and may even include aspects that are defined in the future.

The aggregation of responses performed by AS_A, such as handling of BYE, and handling of exceptional scenarios are not explicitly described. In case the media based partial forwarding is carried by AS_B, then no REFER is sent back to AS_A, and only a 181 response with call forwarding information is sent back. AS_B performs the actions carried out by AS_A by setting up a call towards User C, and also aggregates the responses from User B and User C and then send the responses back to User A's network.

The embodiments disclosed herein can be provided to a normal Next Generation Network, IP Multimedia Subsystems and Session Initiation Protocol User A and a NGN/IMS User C connected to a non-SIP based access network. The embodiments herein also provide call forwarding services having a high penetration rate and offers high revenue to the operator.

The embodiment disclosed herein can be combined with selective call forwarding, for example, forwarding video calls from calling User A 101 to called user and combined with call forwarding timed services. The embodiment disclosed further offers convenience to the end user without the user invoking call transfer and also offers the possibility to receive a part of the media in a single session on multiple terminals easily.

The embodiment also provides new and useful services offering revenue-generation potential and also serves as a useful differentiator for IMS/SIP users and goes with next-generation services.

The embodiment further provides useful solution for practical situations as the served user is interested only in audio calls from a particular user, the user having a low-end terminal can forward part of the media to another terminal, the User C an receive a part of the media on multiple terminals, the user need to forward the calls (unavailable/unconditional/busy) to multiple low-end terminals. In a case the user is in a visited network with the inter-network charging cost per unit bandwidth high and the called user is interested only in receiving important low-bandwidth calls, the User C an forward the other calls to an endpoint in his home network.

As can be appreciated, the embodiments disclosed herein provides several call forwarding services for IMP/SIP users based on network-based evaluation of SDP and partial call forwarding. Also it is to be understood that the invention as described here is not limited to the precise embodiments disclosed herein and that various changes and modifications may be affected therein without departing from the original scope or spirit of present invention.

The embodiments disclosed herein can take the form of an entirely hardware embodiment, an entirely software embodiment or an embodiment including both hardware and software elements. The embodiments that are implemented in software include but are not limited to, firmware, resident software, microcode, etc.

What is claimed is:

1. A method of call forwarding in a telecommunications network, said method comprising:
    comparing a first set of data to a second set of data, wherein the first set of data includes one or more parameters of a Session Description Protocol (SDP) received in connection with an initial call directed toward a first terminal of a user; and the second set of data includes one or more call forwarding parameters of a user profile associated with said user; and
    based on a result of said comparing, forwarding at least one part of said initial call to a second terminal which is different from said first terminal, as specified in said call forwarding parameters, if at least one of said parameters of said SDP matches with at least one of said call forwarding parameters, wherein said forwarding includes:
    sending a refer message to a node of a network employed to initiate a forwarding call, wherein said refer message identifies the at least one part of said initial call to be forwarded and includes an identifier for said second terminal, wherein the identified part of said initial call to be forwarded is determined by said user profile and said SDP, on obtaining a match between at least one of said parameters of said SDP and at least one of said call forwarding parameters; such that the forwarding call to said second terminal is initiated on receipt of said refer message;
    wherein said particular identified part to be forwarded to a given second terminal is determined by said user profile and said SDP, based on the obtained match between at least one of said parameters of the SDP and at least one of said call forwarding parameters.

2. The method, as claimed in claim 1, wherein a plurality of parts of said initial call are forwarded to a plurality of second terminals, and wherein said sending comprises:
    sending a plurality of refer messages equal to a number of the plurality of second terminals to which the plurality of parts of the initial call are to be forwarded, each refer message identifying a particular one of said plurality of parts of said initial call to be forwarded and including an identifier for one of said plurality of second terminals to which the particular identified part is to be forwarded;
    such that a plurality of forwarding calls to said plurality of second terminals are initiated on receipt of said plurality of refer messages.

3. A method, as claimed in claim 1, wherein said telecommunications network is a Session Initiation Protocol (SIP)-based network.

4. A method, as claimed in claim 1, wherein said method is performed by an application server.

5. A method, as claimed in claim 1, wherein said method is performed by a Serving-Call Session Control Function (S-CSCF).

6. A method, as claimed in claim 1, wherein said method is performed by a proxy server of said user.

7. A call forwarding system in a telecommunications network, said system comprising at least one element that operates to:
    compare first and second sets of data with one another, wherein the first set of data includes one or more parameters of a Session Description Protocol (SDP) received in connection with an initial call directed toward a first terminal of a user; and the second set of data includes one or more call forwarding parameters of a user profile associated with said user; and
    based on a result of said comparing, forward at least one part of said initial call to a second terminal which is different than the first terminal, as specified in said call forwarding parameters, if at least one of said parameters of said SDP matches with at least one of said call forwarding parameters, wherein said forwarding includes:
    sending a refer message to a node of a network employed to initiate a forwarding call, wherein said refer message identifies at least one part of said initial call to be forwarded and includes an identifier for said second terminal, wherein the identified part of said initial call to be forwarded is determined by said user profile and said SDP, on obtaining a match between at least one of said parameters of said SDP and at least one of said call forwarding parameters;
    such that the forwarding call to said second terminal is initiated on receipt of said refer message;
    wherein said particular identified part to be forwarded to a given second terminal is determined by said user profile and said SDP, based on the obtained match between at least one of said parameters of the SDP and at least one of said call forwarding parameters.

8. The call forwarding system, as claimed in claim 7, wherein a plurality of parts of said initial call are forwarded to a plurality of second terminals, and wherein said sending comprises:

sending a plurality of refer messages equal to a number of the plurality of second terminals to which the plurality of parts of said initial call are to be forwarded, each refer message identifying a particular one of said plurality of parts of said initial call to be forwarded and including an identifier for one of said plurality of second terminals to which the particular identified part is to be forwarded, such that a plurality of forwarding calls to said plurality of second terminals are initiated on receipt of said plurality of refer messages.

9. A call forwarding module, said module comprising at least one hardware element that operates to:

compare a first set of data to a second set of data, wherein the first set of data includes one or more parameters of a Session Description Protocol (SDP) established in connection with an initial call directed toward a first terminal of a user; and the second set of data includes one or more call forwarding parameters of a user profile associated with said user;

forward at least one part of said initial call to a second terminal which is different from said first terminal, as specified in said call forwarding parameters, if at least one of said parameters of said SDP matches with at least one of said call forwarding parameters; and send one or more refer messages to a node of a network employed to initiate a forwarding call, if it is determined that call forwarding is to be done, such that a forwarding call to a second terminal is initiated on receipt of said refer message, wherein said refer message identifies at least one part of said initial call to be forwarded and includes an identifier for said second terminal;

wherein the particular identified part of the call to be forwarded to a given second terminal is determined by said user profile and said SDP, based on an obtained match between at least one of said parameters of the SDP and at least one of said call forwarding parameters.

* * * * *